United States Patent [19]

Toda

[11] Patent Number: 4,466,580

[45] Date of Patent: Aug. 21, 1984

[54] FISHING REEL

[75] Inventor: Junichi Toda, Sakai, Japan

[73] Assignee: Shimano Industrial Company Limited, Osaka, Japan

[21] Appl. No.: 378,112

[22] Filed: May 14, 1982

[30] Foreign Application Priority Data

May 27, 1981 [JP] Japan .............................. 56-78677[U]

[51] Int. Cl.³ .................... A01K 89/01; A01K 89/02
[52] U.S. Cl. ......................... 242/84.21 R; 242/84.5 A
[58] Field of Search .................. 242/84.21 R, 84.2 R, 242/84.2 G, 84.5 R, 84.5 A, 84.51 R, 84.51 A, 99

[56] References Cited

U.S. PATENT DOCUMENTS

| | | | |
|---|---|---|---|
| 2,515,896 | 7/1950 | Rakoczy | 242/84.53 |
| 2,773,655 | 12/1956 | Mandolf | 242/84.21 R |
| 2,863,617 | 12/1958 | Chapin et al. | 242/84.5 A |
| 2,932,464 | 4/1960 | Mauborgne | 242/84.5 A |
| 3,006,573 | 10/1961 | Holahan, Jr. | 242/84.5 A |

Primary Examiner—Billy S. Taylor
Attorney, Agent, or Firm—Stevens, Davis, Miller & Mosher

[57] ABSTRACT

A fishing reel comprises: a rotary frame driven by a drive mechanism; a spool supported to the front of a spool shaft; a drag mechanism provided at the rear of the spool shaft for applying a load on rotation of the spool shaft, the rotary frame rotating to wind a fishing line onto the spool, the spool being supported rotatably with respect to the spool shaft; and a slide mechanism which is provided between the spool and the spool shaft for holding the spool to the spool shaft under a load slightly smaller than the maximum load corresponding to a strength of the line wound onto the spool, so that when the line is subjected to a load greater than the spool holding load, the spool freely rotates with respect to the spool shaft.

7 Claims, 3 Drawing Figures

U.S. Patent  Aug. 21, 1984  4,466,580
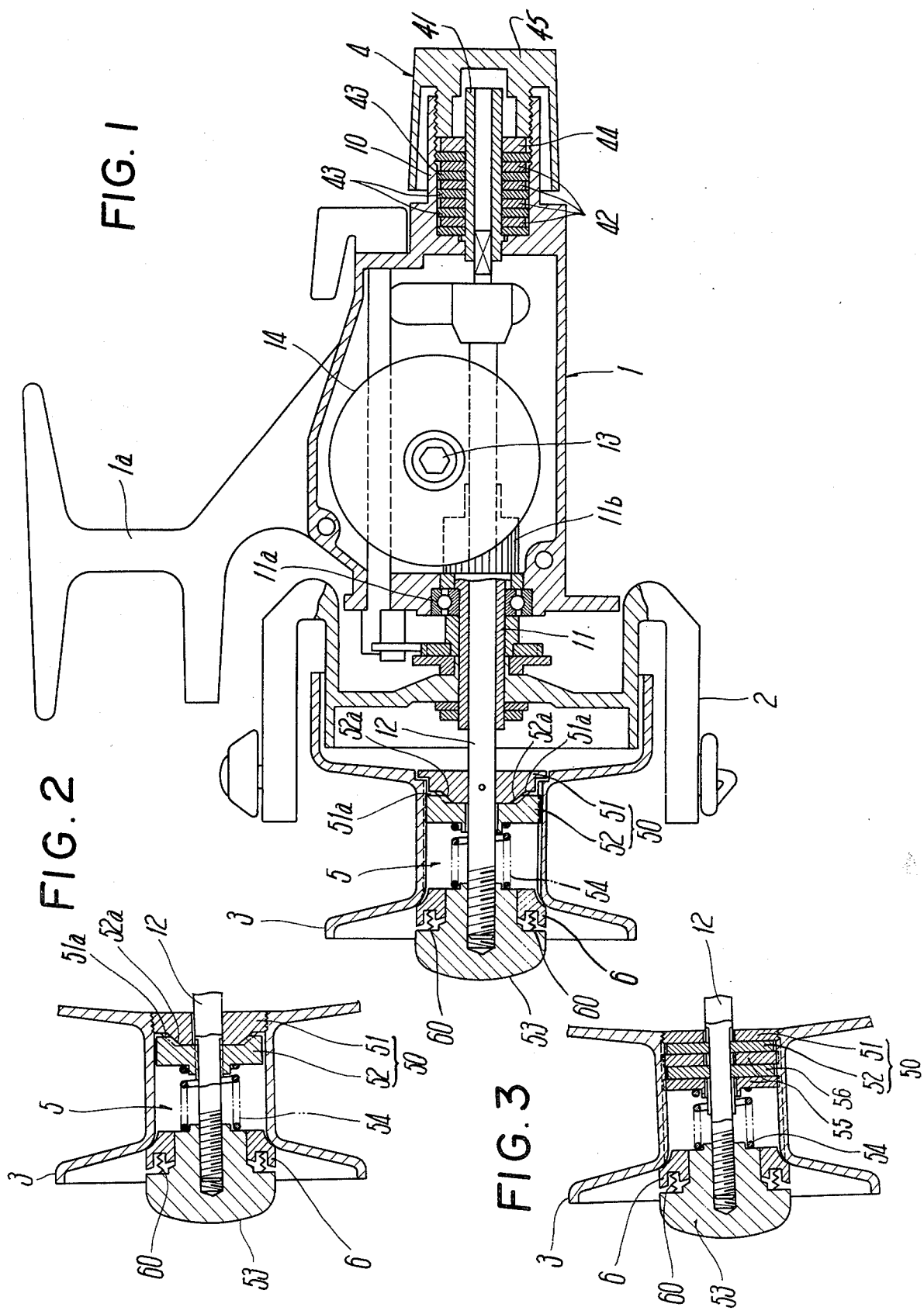

FISHING REEL

FIELD OF THE INVENTION

This invention relates to a fishing reel, and more particularly to a fishing reel which is provided with a reel body, a rotary frame supported rotatably thereto and driven by a drive mechanism, a spool shaft supported to the reel body in relation of being movable longitudinally thereof and rotatable, a spool supported in front of the spool shaft, and a drag mechanism for imparting a load on rotation of the spool shaft, the rotary frame being driven by the drive mechanism to wind a fishing line onto the spool.

BACKGROUND OF THE INVENTION

This kind of fishing reel typically provides the drag mechanism at the rear portion of the spool shaft for adjusting a line-winding force to a value which is smaller than a strength of the fishing line during fishing.

However, a beginner, when the line is pulled violently by a hooked fish, holds a fishing rod with all his strength without immediately and exactly adjusting the drag mechanism, whereby the line is subjected to an excessive load which leads to a broken line.

SUMMARY OF THE INVENTION

In order to solve the above problem, this invention has been designed. An object of the invention is to provide a fishing reel which allows a drag mechanism to adjust a load imparted to rotation of the spool shaft and adjust rotation of the spool, and also when the fishing line is about to be subjected to an excessive load causing breakage of the line, allows the spool to freely rotate through the excessive load in spite of the adjustment of the drag means, thereby making it possible to restrict the load on the line in a safe range which will not cause breakage of the line and to reliably prevent the line from breaking.

This invention is characterized in that between the spool shaft and the spool supported rotatably thereto is interposed a slide mechanism which holds the spool to the spool shaft under a load slightly smaller than the maximum load corresponding to a strength of the line wound onto the spool and which allows the spool to freely rotate with respect to the spool shaft when subjected to a load greater than that for holding the spool.

The fishing reel of the invention constructed in this manner can desirably adjust by the drag mechanism a load applied to rotation of the spool shaft and when, for example, the spool shaft is locked because of improper adjustment of the drag mechanism and the line wound onto the spool is about to be subjected to an excessive load over a holding load to cause the line to break, the spool immediately freely rotates through the slide mechanism to draw out the line from the spool to thereby restrict the load on the line to a safe value smaller than the holding load. Thus, the use of the drive mechanism and slide mechanism prevents breakage of the line while permitting quick winding of the line.

These and other objects of the invention will become more apparent in the detailed description and example which follow.

BRIEF DESCRIPTION OF THE DRAWINGS

FIG. 1 is a partially cutaway side view of an embodiment of a fishing reel of the invention, and FIGS. 2 and 3 are cutaway side views of the principal portions of modified embodiments.

DETAILED DESCRIPTION OF THE INVENTION

A fishing reel shown in the drawing basically comprises a reel body 1 having a mounting leg 1a for a fishing rod, a rotary frame 2 supported rotatably to the reel body 1 and driven by a drive mechanism D, a spool 3, a drag mechanism 4, and a slide mechanism 5, the reel body 1 supporting a tubular shaft 11 rotatably through a bearing 11a and a spool shaft 12 through the tubular shaft 11 in relation of being rotatable and movable longitudinally of the reel body 1.

The drive mechanism D comprises a handle shaft 13 supported rotatably to the side wall of reel body 1, a master gear 14 provided at the projection of handle shaft 13 entering into the reel body 1, and a pinion 11b mounted on the tubular shaft 11. The tubular shaft 11 projects forwardly from the front wall of reel body 1 and the rotary frame 2 is fixed to the end of the projection so that the handle shaft 13 rotates to allow the rotary frame 2 to rotate through the master gear 14 and pinion 11b.

The spool shaft 12 projects at its front end forwardly from the front wall of reel body 1, the projecting front end carrying thereon the spool 3 through the slide mechanism 5, and projects at the rear end rearwardly from the rear wall of reel body 1, the projecting rear end carrying thereon the drag mechanism 4 for applying a load on the free rotation of spool 3 with respect to the spool shaft 12.

The drag mechanism 4 comprises a cylindrical member 10 which projects from the rear wall of reel body 1 and is integral therewith; a tubular shaft 41 having a square bore fitted into the cylindrical member 10 at the center thereof and supported only rotatably to the rear wall of reel body 1; a square end at the rear end of spool shaft 12 fitted into the square bore of tubular shaft 41 to thereby be supported only axially movably with respect to the tubular shaft 41; a plurality of friction plates 42 rotatable integrally with the tubular shaft 41, a plurality of friction plates 43 retained to the cylindrical member 10 and rotatable relative to the tubular shaft 41, and a collar 44, fitted into the cylindrical member 10; and a drag thumb nut 45 with the cylindrical member so that the drag thumb nut 45 is screwed to press both the friction plates 42 and 43 to thereby apply a desired resistance load against rotation of the tubular shaft 41, and in turn the spool shaft 12.

It is important for the invention that the spool 3 is supported rotatably to the foremost end of the spool shaft 12, and between the spool 3 and the front end portion of spool shaft 12 is inserted a slide mechanism which holds the spool 3 to the spool shaft 12 under a load slightly smaller than the maximum load corresponding to a strength of the fishing line to be wound onto the spool 3 so that, when the line is subjected to a load larger than that for holding the spool 3, the spool 3 is allowed to freely rotate with respect to the spool shaft 12.

The slide mechanism 5 comprises a first member 51 fixed to one of the spool shaft 12 and spool 3, a second member 52 supported axially movably to the other and slidable with respect to the first member 51, and a biasing means 54 which biases the second member 52 to the first member 51 and sets a load for sliding the second member 52.

In an embodiment shown in FIG. 1, the first member 51 is fixed to the front portion of spool shaft 12 and the second member 52 is freely sleeved onto the spool shaft 12, the first and second members 51 and 52 constituting a clutch means 50. An adjuster 53 is screwed with the utmost end of spool shaft 12 and the biasing means 54, mainly of a coil spring, is interposed between the adjuster 53 and the second member 52, thereby forming the slide mechanism 5.

The second member 52 is mounted on the inner surface of a trunk of spool 3 in relation of being only axially movable through a mounting means like a spline coupling. The clutch means 50 is of a slide clutch type, whose members 51 and 52 have at the facing sides a number of engaging teeth 51a and 52a each of a chevron shape in section and of the slide-clutch type.

The engaging teeth 51a and 52a engage with each other to hold the spool 3 to the spool shaft 12, in which the holding load is desirably set by adjusting a biasing force of the biasing means 54 through the screwable adjustment of adjuster 53, the holding load being made slightly smaller than the maximum load corresponding to a strength of the line wound on the spool 3. When the fishing line is subjected to a load smaller than the holding load, the second member 52 is biased by the biasing means 54 toward the first member 51 so that the engaging teeth 51a and 52a engage with each other, thereby fixing the second member 52 to the first member 51, in turn the spool 3 to the spool shaft 12.

In a case that the fishing line is subjected to a load larger than the load for holding the spool 3, that is, a load which would cause breakage of the line, the engaging teeth 52a at the second member 52 axially slide against the biasing means 54 in a manner of riding over those 51a at the first member 51, thus allowing the spool 3 to freely rotate with respect to the spool shaft 12.

The holding load for the spool 3 is adjustable corresponding to the kind of fishing line by screwing or unscrewing the adjuster 53 to charge a spring force of biasing means 54, in which a proper value of the holding load can be selected referring to a number corresponding to each fishing line displayed at the front side of spool 3. Also, an adapter 6 having springs 60, as shown in FIG. 1, is interposed between the spool 3 and the adjuster 53 to avoid creating a play therebetween. Adapter 6 contacts elastically with spool 3.

The fishing reel of the invention constructed as just described is used for fishing after the adjuster 53 is set to adjust the spring force of biasing means 54 corresponding to a strength of the line wound onto the spool 3. When a fish is hooked, a handle (not shown) attached to the handle shaft 13 is turned to rotate the rotary frame 2 through the master gear 14 and tubular shaft 11 at the drive means D, thereby winding the line onto the spool 3.

The drag thumb nut 45, during the winding-up of the line for fishing, is properly rotated to adjust the drag mechanism 4 corresponding to size of the hooked fish or intensity of its pull. When an angler barely holds the fishing rod and cannot exactly adjust the drag mechanism 4, and excessively tightens the drag thumb nut 45 to apply to the spool shaft 12 a resistance overcoming a strength of the line, or which locks the spool shaft 12, and if the line is then subjected to the maximum load corresponding to a strength of the line, in other words, a load sufficient to break the line, the slide mechanism 5 immediately operates to allow the spool 3 to freely rotate, whereby the line is drawn out of the spool 3 corresponding to the applied load and there is no fear of breaking the line.

Alternatively, the first member 51, as shown in FIG. 2, may be fixed to the rear end of the trunk of spool 3 and the second member 52 may be mounted to the spool shaft 12 in relation of being only movable axially of spool shaft 12 by use of a mounting means, such as spline coupling.

Also, the slide mechanism, as shown in FIG. 3, may alternatively employ a friction type clutch.

In this instance, the first and second members 51 and 52 are formed of friction plates, the first member 51 being fixed to the rear end of the trunk of spool 3, the second member 52 being mounted on the spool shaft 12 axially movably thereof through spline coupling or the like so that both members 51 and 52 are biased by the biasing means 54 to be frictionally coupled. In order to improve the sliding function of both members 51 and 52, first auxiliary members 55 of friction plate are provided in front of the second member 52 only axially movably with respect to the trunk of spool 3 and a second auxiliary member 56 of a friction plate is provided between the first auxiliary members 55 only axially movably with respect to the spool shaft 12, the first and second auxiliary members 55 and 56 being connected by spline coupling or the like so that the second member 52 and first auxiliary member 55 and the first and second auxiliary members 55 and 56 are friction-coupled respectively by the biasing means 54.

As seen from the above, the fishing reel of the invention, when an excessive load is about to act on the line to cause it to break, allows the spool 3 to freely rotate through the slide mechanism 5, thereby always restricting the load applied to the line in a safe range which will not break the line.

Although several embodiments have been described, they are merely exemplary of the invention and not to be constructed as limiting, the invention being defined solely by the appended claims.

What is claimed is:

1. A fishing reel comprising:
   a reel body;
   a rotary frame supported rotatably to said reel body;
   a drive mechanism for driving said rotary frame;
   a spool shaft supported to said reel body in a manner permitting it to be movable longitudinally of said reel body and rotatable;
   a spool supported to said spool shaft at the front portion thereof, said spool being supported rotatably with respect to said spool shaft;
   a drag mechanism including means within the reel body for applying a selectable load to rotation of said spool shaft; and
   a slide mechanism provided between said spool and said spool shaft which holds said spool to said spool shaft under a load slightly smaller than the maximum load associated with a strength of a fishing line wound onto said spool and, when said line is subjected to a load larger than the load holding said spool, which automatically allows said spool to freely rotate with respect to said spool shaft irrespective of a load applied to rotation of said spool shaft by said drag mechanism.

2. A fishing reel according to claim 1, wherein said slide mechanism comprises a first member fixed to one of said spool shaft and spool, a second member supported movably to the other and made slidable with respect to said first member, and a biasing means which biases said second member to said first member and sets a sliding load for said second member.

3. A fishing reel according to claim 2, wherein said first and second members form a clutch member, said slide mechanism being of a slide clutch type.

4. A fishing reel according to claim 2, wherein said first and second members are friction plates, said slide mechanism being of a friction clutch type.

5. A fishing reel according to claim 2, wherein said biasing means includes an adjuster for adjusting a biasing force to bias said second member to said first member.

6. A fishing reel according to claim 5, wherein said adjuster screws with an axial end of said spool shaft, said adjuster having an adapter contacting elastically with said spool.

7. A fishing reel according to claim 6 wherein said adjuster comprises a first part which screws with said axial end of said spool shaft, a second part forming said adapter, and means interposed between said first and second parts for biasing said adapter against said spool.

* * * * *